United States Patent
Mazzurco et al.

(10) Patent No.: US 7,187,649 B1
(45) Date of Patent: Mar. 6, 2007

(54) METHOD AND APPARATUS FOR PROVIDING NETWORK PROTECTION AT INPUT/OUTPUT INTERFACES OF A CROSS-CONNECT SWITCH

(75) Inventors: Anthony Mazzurco, Plano, TX (US); Joseph A. Crossett, III, Richardson, TX (US); Manouchehr Darabpour, Carrollton, TX (US)

(73) Assignee: Alcatel Lucent, Paris (FR)

( * ) Notice: Subject to any disclaimer, the term of this patent is extended or adjusted under 35 U.S.C. 154(b) by 336 days.

(21) Appl. No.: 09/472,534

(22) Filed: Dec. 27, 1999

(51) Int. Cl.
*H04J 1/16* (2006.01)
*H04L 12/66* (2006.01)
*H04L 12/28* (2006.01)

(52) U.S. Cl. ........................ 370/228; 370/356; 370/403

(58) Field of Classification Search ........ 370/216–228, 370/248–249, 400
See application file for complete search history.

(56) References Cited

U.S. PATENT DOCUMENTS

| | | | |
|---|---|---|---|
| 4,956,835 A | 9/1990 | Grover | 370/228 |
| 5,216,666 A * | 6/1993 | Stalick | 370/222 |
| 5,479,608 A * | 12/1995 | Richardson | 714/4 |
| 5,495,472 A * | 2/1996 | Ohara | 370/224 |
| 5,870,382 A * | 2/1999 | Tounai et al. | 370/220 |
| 5,978,354 A * | 11/1999 | Taketomi et al. | 370/226 |
| 6,201,788 B1 * | 3/2001 | Ishiwatari | 370/228 |
| 6,226,111 B1 * | 5/2001 | Chang et al. | 398/9 |
| 6,504,963 B1 * | 1/2003 | Fang et al. | 385/16 |
| 6,526,021 B1 * | 2/2003 | Dempsey | 370/227 |
| 6,579,018 B1 * | 6/2003 | Li et al. | 398/4 |
| 6,760,302 B1 * | 7/2004 | Ellinas et al. | 370/228 |

FOREIGN PATENT DOCUMENTS

| | | |
|---|---|---|
| EP | 0 818 940 A2 | 1/1998 |
| EP | 0 820 163 A2 | 1/1998 |
| EP | 0 855 813 A2 | 7/1998 |

* cited by examiner

*Primary Examiner*—Chi Pham
*Assistant Examiner*—Melanie Jagannathan
(74) *Attorney, Agent, or Firm*—Baker Botts, LLP; Jessica W. Smith; V. Lawrence Sewell

(57) ABSTRACT

A telecommunications system (10) includes a first cross-connect switch (12) and a second cross-connect switch (14). The first cross-connect switch (12) includes a switching matrix that provides information from a matrix connection to a selector (28) of an output interface (18). The selector (28) places the information from the switching matrix onto one or both of a working channel (24) and a protection channel (26). The second cross-connect switch (14) receives the working channel (24) and the protection channel (26) at an input interface (20). The input interface (20) includes a selector (30) that checks a signal quality of the working channel (24) and the protection channel (26). When necessary, the selector (30) sends a request to the selector (28) to bridge the working channel (24) onto the protection channel (26). According to the signal quality, the selector (30) selects one of the working channel (24) and the protection channel (26) for transfer to a switching matrix (22) of the second cross-connect switch (14). The selector (30) avoids creating and deleting matrix connections in the switching matrix (22) in performing protection switches between the working channel (24) and the protection channel (26).

11 Claims, 3 Drawing Sheets

METHOD AND APPARATUS FOR PROVIDING NETWORK PROTECTION AT INPUT/OUTPUT INTERFACES OF A CROSS-CONNECT SWITCH

TECHNICAL FIELD OF THE INVENTION

The present invention is related in general to telecommunications signal transport and more particularly to a method and apparatus for providing network protection at input/output interfaces of a cross-connect switch.

BACKGROUND OF THE INVENTION

When network protection is implemented in a cross-connect switch, there are stringent requirements concerning the amount of time needed to perform the protection switch once a problem has been detected. Typically, the protection switch is performed by cutting another connection through the matrix of the cross-connect switch. However, cutting another connection through the matrix has various disadvantages. Cross-connection algorithms generally take more time to complete than is allowed by the protection switching requirements. For example, the protection switching requirements specify tens of milliseconds rather than the hundreds of milliseconds it takes to cut a new connection. Creating and deleting cross-connections may not meet the desired switching times. If center stage rearrangements are required in a standard three stage non-blocking matrix, then the time needed to adjust matrix connections for a protection switch may take even longer. Therefore, it is desirable to avoid the slower than required changes in matrix connections to perform a protection switch in a cross-connect switch.

SUMMARY OF THE INVENTION

From the foregoing, it may be appreciated by those skilled in the art that a need has arisen for a technique to perform protection switching that does not require changing connections in the matrix of a cross-connect switch. In accordance with the present invention, a method and apparatus for providing network protection at input/output interfaces of a cross-connect switch are provided that substantially eliminate or reduce disadvantages and problems associated with conventional protection switching techniques.

According to an embodiment of the present invention, there is provided a method for providing network protection at input/output interfaces of a cross-connect switch that includes receiving an inbound working channel and an inbound protection channel at an input interface. A signal quality of the inbound working and protection channels is determined. One of the inbound working and protection channels is selected in response to the signal quality of the inbound working and protection channels. The selected one of the inbound working and protection channels is provided to a switching matrix. Thus, protection switching is performed at the interfaces to the cross-connect switch and not in the switching matrix. Pre-determined connections in the switching matrix may be maintained regardless of which one of the inbound working and protection channels are selected to be provided to the switching matrix.

The present invention provides various technical advantages over conventional protection switch techniques. For example, one technical advantage is to avoid adjusting connections in a matrix of a cross-connect switch to effect a protection switch. Another technical advantage is to provide a capability to effect protection switches in a cross-connect switch at its input/output interfaces rather than its matrix. Yet another technical advantage is to provide a simpler protection switch technique for any protection scheme implementation. Other technical advantages may be readily apparent to those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
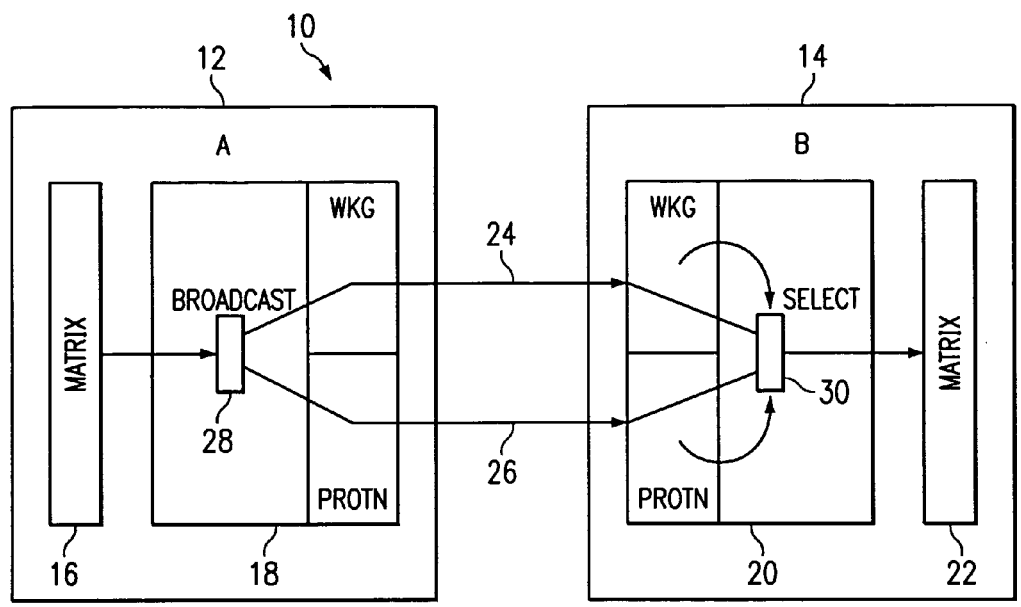
FIG. 1 illustrates a protection switch for a 1+1 linear automatic protection switching protection scheme.

FIG. 1 shows a portion of two cross-connect switches in a telecommunications system 10. FIG. 1 illustrates an example of a 1+1 linear automatic protection switching protection scheme. Telecommunications system 10 includes a first cross-connect switch 12 at a node A and a second cross-connect switch 14 at a node B. First cross-connect switch 12 includes a switching matrix 16, an output interface 18, and an input interface (not shown). Second cross-connect switch 14 includes an input interface 20, a switching matrix 22, and an output interface (not shown). The input interface for first cross-connect switch 12 may be similar to input interface 20 of second cross-connect switch 14. Also, the output interface of second cross-connect switch 14 may be similar to output interface 18 of first cross-connect matrix 12. Information is carried between nodes A and B over one or both of a working channel 24 and a protection channel 26.

In operation, information is transferred over a matrix connection in switching matrix 16 to output interface 18. Switching matrix 16 may implement any type of switching scheme including a three stage non-blocking switching technique. Output interface 18 receives the information from switching matrix 16 at a bridge selector 28. Bridge selector 28 places the information onto both working channel 24 and protection channel 26. Second cross-connect switch 14 receives working channel 24 and protection channel 26 at input interface 20. Input interface 20 includes a selector 30 that determines a signal quality of both working channel 24 and protection channel 26. Based on the signal qualities, selector 30 selects one of working channel 24 and protection channel 26. The selected one of working channel 24 and protection channel 26 is provided to switching matrix 22. Switching matrix 22 can maintain its pre-determined matrix connections regardless of which one of working channel 24 and protection channel 26 is selected. Thus, time consuming creation and deletion of matrix connections to accommodate a protection switch is avoided.

Figure 2:
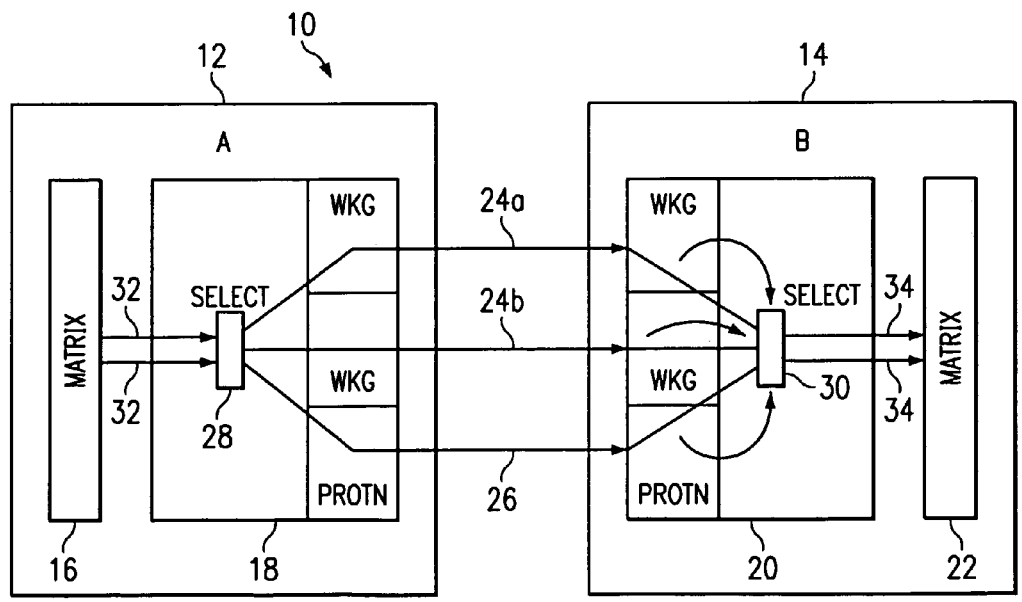
FIG. 2 illustrates a protection switch for a 1:n linear automatic protection switching protection scheme.

FIG. 2 shows an example of a linear 1:n automatic protection switching protection scheme. In this example, n is 2 but may include any integer number. Switching matrix 16 of node A provides two information lines 32 to output interface 18. Selector 28 receives the two information lines and broadcasts the information over protection channel 26 and a plurality of working channels 24*a* and 24*b* in order to transfer the information. Selector 28 may also broadcast the information over protection channel 26 upon detecting a failure in any of working channels 24. At input interface 20 of node B, selector 30 receives protection channel 26 and the plurality of working channels 24*a* and 24*b*. Selector 30 determines a signal quality of each of the plurality of working channels 24*a* and 24*b*. If a working channel fails, selector 30 signals 28 to place the failed channel on protection channel 26. Selector 30 selects the data of the failed channel from protection channel 26 and the plurality of the unfailed working channels, either 24*a* or 24*b*, onto information lines 34 for transport to switching matrix 22.

Figure 3:
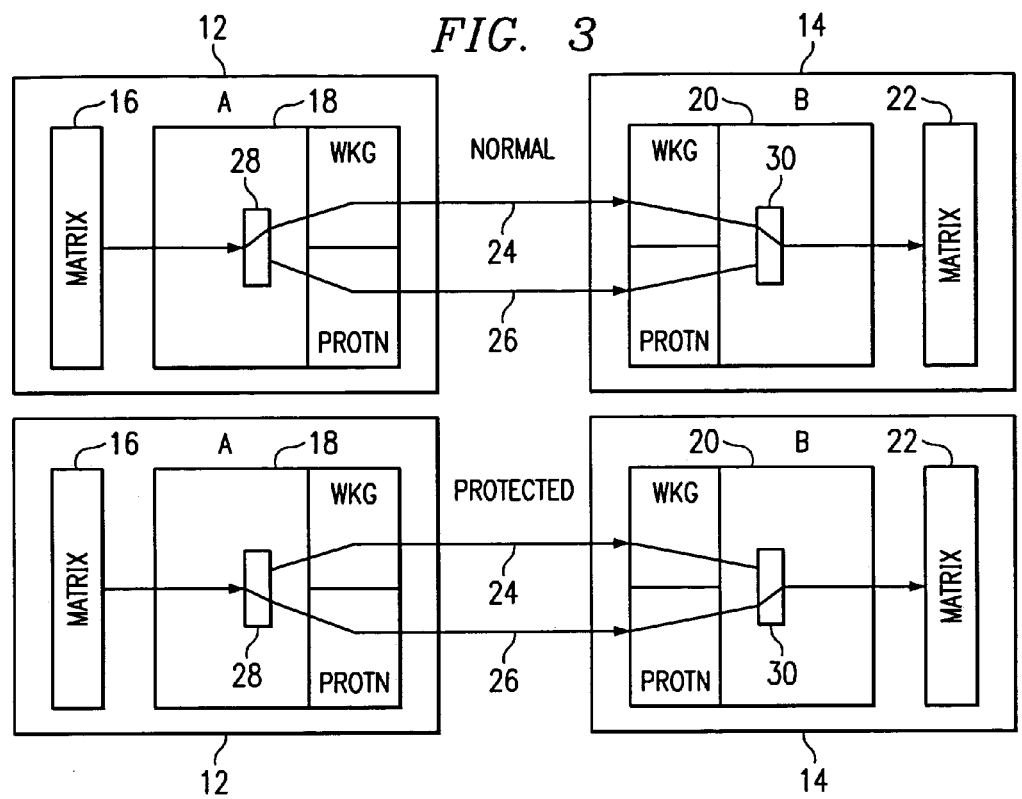
FIGS. 3A and 3B illustrate a protection span switch for a bidirectional line switched ring protection scheme.

FIGS. 3A and 3B show an example of a bidirectional line switched ring protection scheme. FIG. 3A shows a normal operation of the bidirectional line switched ring protection scheme where selector 28 provides information received from switching matrix 16 to working channel 24 and selector 30 switches the information on working channel 24 for transfer to switching matrix 22. Selector 30 checks the signal quality of working channel 24 and protection channel 26. FIG. 3B shows operation during a span switch. For a span switch, selector 28 places information from switching matrix 16 onto protection channel 26 in response to a request from selector 30. Selector 30 provides information from protection channel 26 to switching matrix 22. A span switch may occur whenever working channel 24 has poor or no signal quality.

Figure 4:
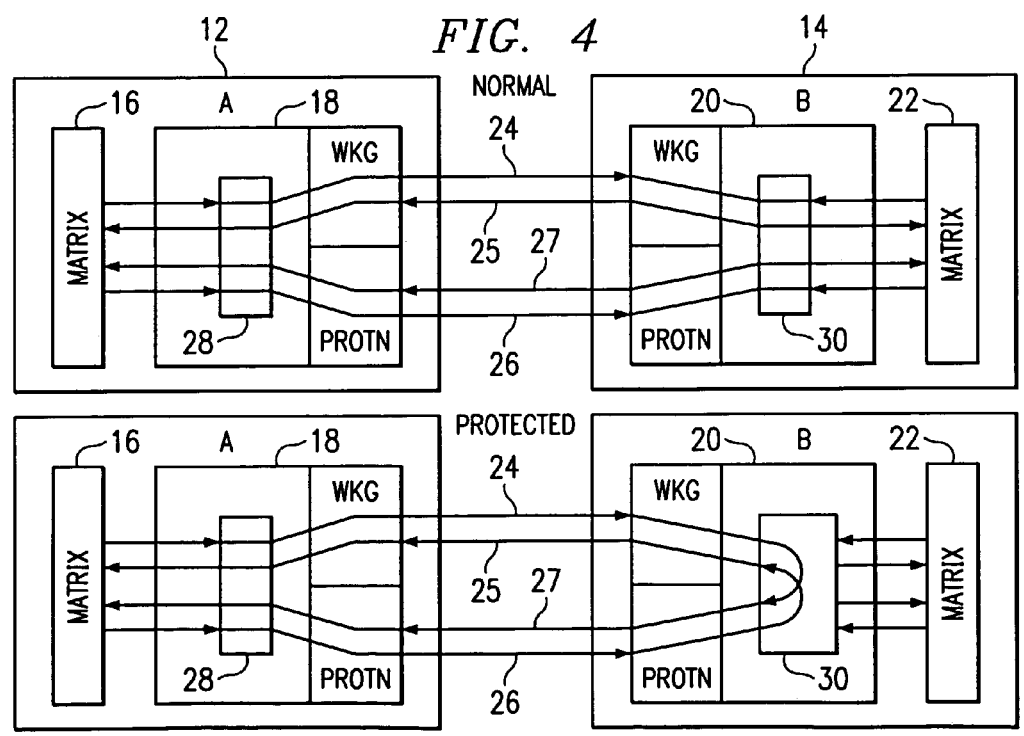
FIGS. 4A and 4B illustrate a protection ring switch for a bidirectional line switched ring protection scheme.

FIGS. 4A and 4B show a ring switch in a bidirectional line switched ring protection scheme. FIG. 4A shows a normal operation where selector 28 provides information to working channel 24 and protection channel 26 inbound to input interface 20 at node B. Input interface 20 also provides an outbound working channel 25 and an outbound protection channel 27. FIG. 4B shows the events involved in a ring switch. Upon detection of a failure in the channels between node B and another node, selector 30 routes information on inbound working channel 24 to outbound protection channel 27. Selector 30 also routes information on inbound protection channel 26 to outbound working channel 25. The routing performed by selector 30 effects the ring switch without disrupting matrix connections within either switching matrix 22 or switching matrix 16.

Figure 5:
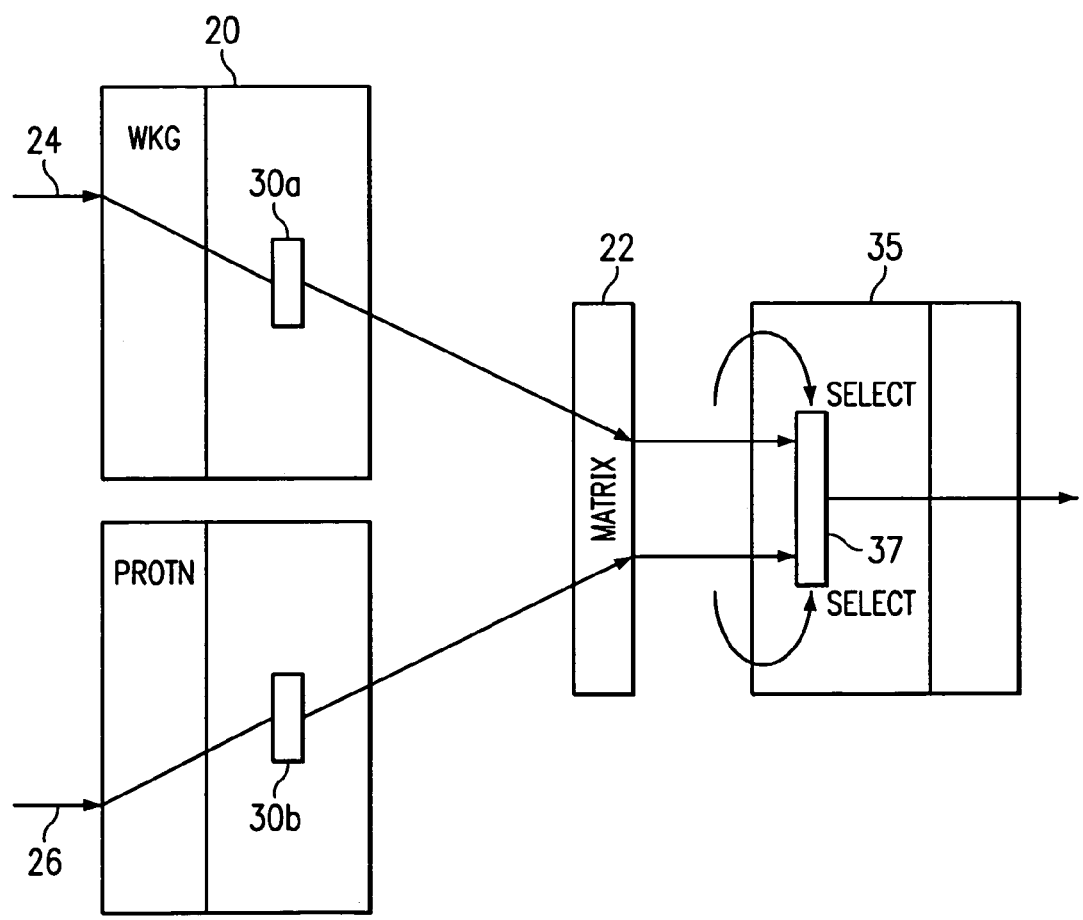
FIG. 5 illustrates a protection switch for a fast facility protection scheme.

FIG. 5 shows a fast facility protection (FFP) scheme. The FFP scheme may occur within cross-connect switch 14. Cross-connect switch 14 receives working channel 24 and protection channel 26 at input interface 20. Selector 30*a* provides working channel 24 to switching matrix 22 and selector 30*b* provides protection channel 26 to switching matrix 22. Switching matrix 22 provides working channel 24 and protection channel 26 to an output interface 35. Output interface 35 includes a selector 37 that receives working channel 24 and protection channel 26 from switching matrix 22. Selector 37 checks a signal quality of both working channel 24 and protection channel 26 and accordingly selects on of working channel 24 and protection channel 26 for output.

All of the protection schemes discussed above provide for the occurrence of protection switching in the input and output interfaces of a cross-connect switch to avoid disruption of matrix connections in the switching matrix of the cross-connect switch. Thus, protection switching time requirements may be efficiently met without expending various resources necessary to perform a conventional protection switching operation. Though certain protection schemes are described, other protection schemes may implement this protection switching technique, including unidirectional path switched ring protection schemes.

Thus, it is apparent that there has been provided, in accordance with the present invention, a method and apparatus for providing network protection at input/output interfaces of a cross-connect switch that satisfy the advantages set forth above. Although the present invention has been described in detail, it should be understood that various changes, substitutions, and alterations may be readily ascertainable by those skilled in the art and may be made herein without departing from the spirit and scope of the present invention as defined by the following claims.

What is claimed is:

1. A method for line protection in a transmission switch, comprising:

receiving one or more working channels and at least one protection channel at an input interface to the transmission switch;

performing a selection at the input interface between the working and protection channels in response to a signal quality of the working and protection channels; and switching the selected ones of the working and protection channels through one or more pre-determined matrix connections in a matrix in the transmission switch, wherein the pre-determined matrix connections are not disrupted due to the selection at the input interface between the working and protection channels.

2. The method of claim 1, wherein a number n of working channels and one protection channel is received and wherein the step of performing a selection comprises selecting all of the number n of working channels or selecting the one protection channel and n−1 of the working channels and wherein a number n of pre-determined connections are maintained in the matrix without disruption.

3. The method of claim 2, further comprising the step of providing a protection switch request to an originator of the n number of working channels and protection channel to switch transmission of one of the number n of working channels to the protection channel.

4. The method of claim 3, wherein the network protection is a 1:n linear automatic protection scheme.

5. The method of claim 1, wherein one working channel and one protection channel is received and wherein the step of performing a selection comprises selecting between the working channel and the protection channel and wherein one predetermined connection through the matrix is maintained without disruption.

6. The method of claim 5, wherein a common data signal is received on both the one working channel and the one protection channel.

7. The method of claim 6, wherein the network protection is a 1:1 linear automatic protection scheme.

8. A method for line protection in a transmission switch, comprising:

receiving at least one inbound working channel and at least one inbound protection channel to the transmission switch;

providing at least one outbound working channel and at least one outbound protection channel;

switching the inbound working channel and the inbound protection channel through matrix connections in a switching matrix to outbound working channel and outbound protection channel; and in response to a line failure, routing information on inbound working channel to outbound protection channel and routing information on inbound protection channel to outbound working channel at an input/output interface, wherein routing of the working and protection channels at the input/output interface prevents information from being provided to the matrix such that the matrix connections are not disrupted.

9. The method of claim 8, wherein the network protection is a bidirectional line switched ring protection scheme implementing a ring switch.

10. An apparatus for providing network protection at a cross-connect switch, comprising:
   an input interface that receives at least one inbound working channel and an inbound protection channel, wherein the input interface includes a selector to select between the inbound working channel and the protection channel in response to a signal quality of the working and protection channels; and
   a switching matrix that switches the selected one of the inbound working and protection channels over a pre-determined matrix connection, wherein the pre-determined matrix connection is not disrupted in response to the selection of the inbound working and protection channel.

11. The apparatus of claim 10, further comprising:
   an output interface that receives the selected one of the inbound working and protection channels from the switching matrix, the outbound interface operable to broadcast the selected one of the inbound working and protection channels onto an outbound working channel and an outbound protection channel.

* * * * *